US012573123B2

(12) United States Patent
Tran et al.

(10) Patent No.: US 12,573,123 B2
(45) Date of Patent: Mar. 10, 2026

(54) VISUALIZING WEATHER IN DIGITAL ENVIRONMENTS

(71) Applicant: THE WEATHER COMPANY, LLC, Brookhaven, GA (US)

(72) Inventors: Thai Quoc Tran, San Jose, CA (US); Qaish Shabbir Kanchwala, Atlanta, GA (US); Prachi Shirish Khadke, Arlington, MA (US); Manan Goyal, Secaucus, NJ (US)

(73) Assignee: The Weather Channel, LLC

( * ) Notice: Subject to any disclaimer, the term of this patent is extended or adjusted under 35 U.S.C. 154(b) by 134 days.

(21) Appl. No.: 18/543,035

(22) Filed: Dec. 18, 2023

(65) Prior Publication Data

US 2025/0200856 A1    Jun. 19, 2025

(51) Int. Cl.
*G06T 13/60* (2011.01)
*G06T 15/04* (2011.01)

(52) U.S. Cl.
CPC ............. *G06T 13/60* (2013.01); *G06T 15/04* (2013.01)

(58) Field of Classification Search
CPC ............................... G06T 13/60; G06T 15/04
See application file for complete search history.

(56) References Cited

U.S. PATENT DOCUMENTS

| 6,798,407 B1 | 9/2004 | Benman |
| 6,915,211 B2 | 7/2005 | Kram |
| 7,269,539 B2 | 9/2007 | Wang |
| 2008/0147325 A1 | 6/2008 | Maassel et al. |
| 2008/0180282 A1* | 7/2008 | Brosius ............ G08G 1/096775 |
| | | 340/995.27 |
| 2011/0016433 A1 | 1/2011 | Shipley |
| 2014/0201667 A1 | 7/2014 | Schoeberl |
| 2016/0356922 A1* | 12/2016 | Mccann ................. G01W 1/10 |
| 2019/0176027 A1 | 6/2019 | Smith et al. |
| 2020/0035028 A1* | 1/2020 | Cornell ................. G06T 13/60 |
| 2020/0380787 A1* | 12/2020 | Croxford ............. G06T 19/006 |
| 2023/0065027 A1* | 3/2023 | Curtis ................. G06T 15/005 |
| 2025/0078381 A1* | 3/2025 | Curtis .................... G06T 13/80 |

FOREIGN PATENT DOCUMENTS

| CN | 114998492 A | 9/2022 |
| CN | 115953560 A | 4/2023 |

OTHER PUBLICATIONS

Tang, Ying, et al. "Natural textures for weather data visualization." Tenth International Conference on Information Visualisation (IV'06). IEEE, 2006. (Year: 2006).*
Dübel, Steve, and Heidrun Schumann. "Visualization of features in 3D terrain." ISPRS International Journal of Geo-Information 6.11 (2017): 357. (Year: 2017).*

(Continued)

*Primary Examiner* — Yu Chen
(74) *Attorney, Agent, or Firm* — Barnes & Thornburg LLP

(57) ABSTRACT

Techniques are described with respect to a system, method, and computer program product for visualizing weather in a digital environment. An associated method includes; receiving a plurality of weather data; converting the plurality of weather data for a texture model associated with a plurality of virtual objects associated with the digital environment; and visualizing at least one derivative of the conversion in the digital environment based on the model.

17 Claims, 6 Drawing Sheets

400

(56) References Cited

OTHER PUBLICATIONS

International Search Report and Written Opinion in PCT/US2024/060482, dated Feb. 13, 2025, 8 pages.

Bromfield et al., "Evaluation of Low-Cost Solutions to Support Flight Operations Quality Assurance", Journal of Air Transportation 28.1 (2020): 19 pps.

Jain et al., "Modeling and simulation for emergency response: workshop report, standards and tools", NISTIR 7071, US Department of Commerce, Technology Administration, National Institute of Standards and Technology, Dec. 2003, 116 pps.

Real et al., "User-defined functions for HDF5." arXiv preprint, arXiv:2109.11709, Sep. 24, 2021, 11 pps.

* cited by examiner

400

600

START

Receiving weather data — 610

Analyzing physical space associated with a user — 620

Sampling the weather data at time intervals — 630

Transforming sampled weather data to axis data — 640

Applying the axis data to a texture model — 650

Overlaying UV layers associated with texture model — 660

Visualizing physics-based weather impacts in digital environment — 670

VISUALIZING WEATHER IN DIGITAL ENVIRONMENTS

BACKGROUND

This disclosure relates generally to the field of physics applied to virtual, augmented, extended, and/or mixed reality-based objects, and more particularly to visualizing weather and weather impacts on virtual objects within digital environments.

Various techniques such as, but not limited to ecological niche modeling (ENM), crowd-sourcing, cognitive techniques, etc. have been utilized in order to ascertain data pertaining to climate/weather in a continuous manner. For example, historical analyses of weather distribution for a geographic area, subject matter expert (SME) knowledge databases, raw weather variables using different aggregation operations, and the like are a few mechanisms that may be taken into account when ascertaining weather related data. Furthermore, visualizing weather related data and conditions/impacts derived from weather related data may be difficult due to various constraints such as, but not limited to data sparsity, dataset variability, limitations on access to computing resources, etc. Furthermore, current visualization of weather in digital environments is typically limited to static data resulting in the visualizations not reflecting real-time impacts and interactions. Therefore, it may be advantageous to have a mechanism that utilizes non-static data in order to optimally visualize both weather in digital environments and its impact on virtual objects within the digital environments.

SUMMARY

Additional aspects and/or advantages will be set forth in part in the description which follows and, in part, will be apparent from the description, or may be learned by practice of the invention.

A system, method, and computer program product for visualizing weather in a digital environment is disclosed herein. In some embodiments, a computer-implemented method for visualizing weather in a digital environment comprises receiving a plurality of weather data; converting the plurality of weather data for a texture model associated with a plurality of virtual objects associated with the digital environment; and visualizing at least one derivative of the conversion in the digital environment based on the model.

In some aspects of an embodiment of the present invention, physics-based impacts are derived from the conversion of the plurality of weather data into two-dimensional textures associated with the texture model; wherein the conversion comprises a calculated physics-based impact derived from the plurality of weather data that is applied to one or more of the plurality virtual objects. The calculated physics-based impacts to the virtual objects are visualized within the digital environment.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
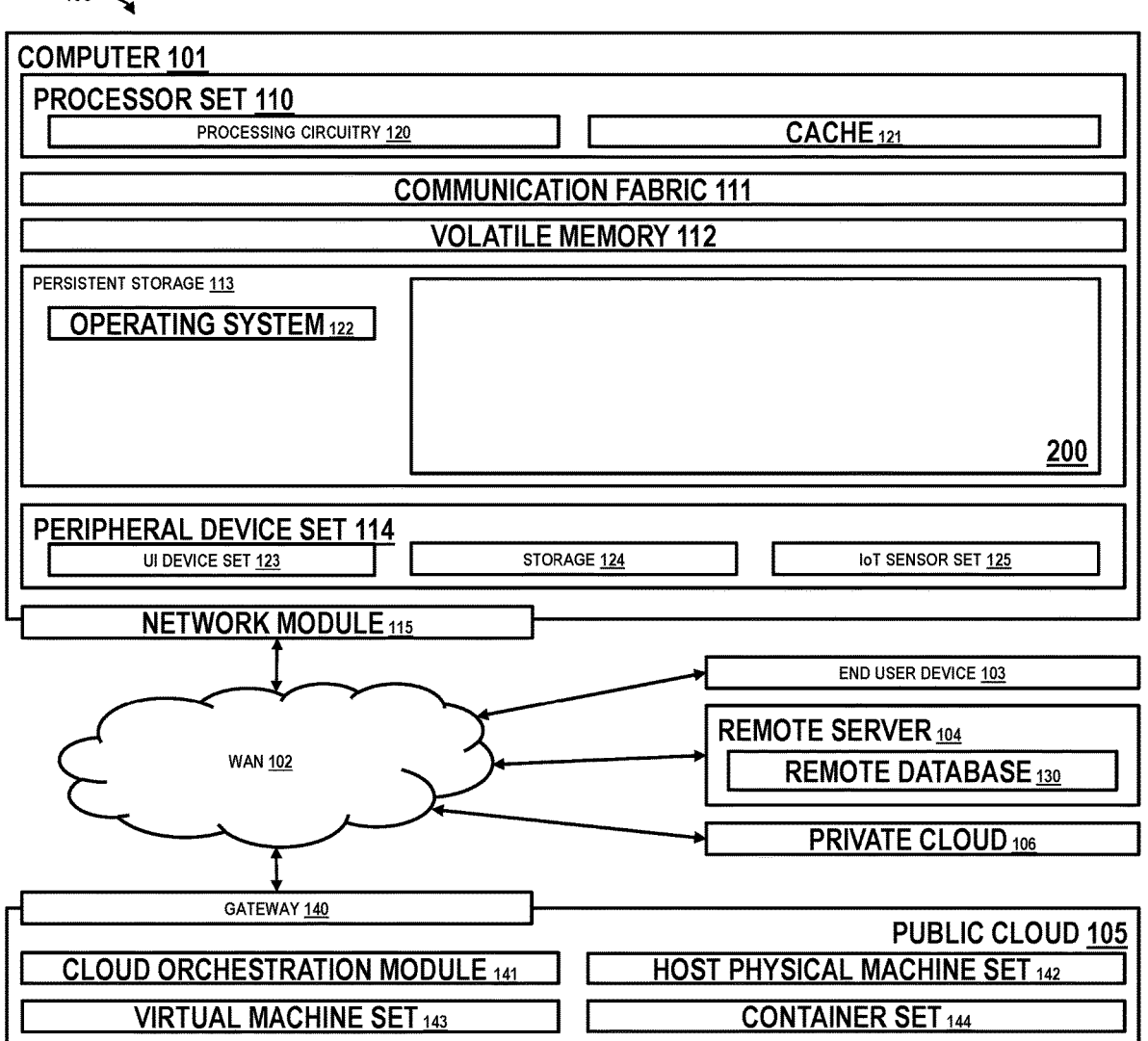
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for visualizing weather in a digital environment. Artificial intelligence, machine learning models, weather analytics systems, and other applicable technologies may be able to not only ascertain the weather in a particular geographic region, but also generate predictions regarding the weather. However, due to various factors such as, but not limited to data sparsity, dataset variability, limitations on access to computing resources, etc. it is difficult to ascertain physics-based impacts caused by the weather (e.g., wind speed, humidity, precipitation, atmospheric pressure, cloud coverage, etc.). Virtual, augmented, mixed, and extended reality technologies provide an interactive experience combining virtual elements, with a real world environment where the objects that reside in the real world are enhanced by computer-generated perceptual information, sometimes across multiple sensory modalities, including visual, auditory, haptic, somatosensory, and olfactory. These aforementioned technologies can be defined as systems that fulfill a combination of real and virtual worlds, real-time interaction, and accurate 3D registration of virtual and real objects. In particular, physics and other applicable information derived from weather data may be computed and visualized within digital environments; however, due to the aforementioned constraints visualization of weather based impacts on digital environments and their virtual elements (i.e., virtual objects) is difficult. Thus, the present embodiments have the capacity to ascertain physics-based elements of weather data in order to visualize both the weather and the physics-based impacts within digital environments. Furthermore, the present embodiments have the capacity to optimize computing of physics-based elements of weather data by utilizing a texture model to transform weather data streaming in real-time into physic-based weather impacts visualized within digital environments in a scalable manner; thus, reducing the amount of computing resources otherwise necessary to perform translations of continuously streaming weather data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described herein "weather data" refers to any applicable historical and/or real-time climate information including, but not limited to data ascertained from weather Geographic Information Systems (GIS), Meteorological Simulation Data Ingest System (MADIS), Environmental Systems Research Institute (ESRI), PRISM/RMA, social media platforms, crowd-sourcing platforms, machine learning-based systems generating predictions based on data derived from the aforementioned, and any other applicable weather and/or geographical information data sources known to those of ordinary skill in the art.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method, and computer program product for visualizing weather in a digital environment. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
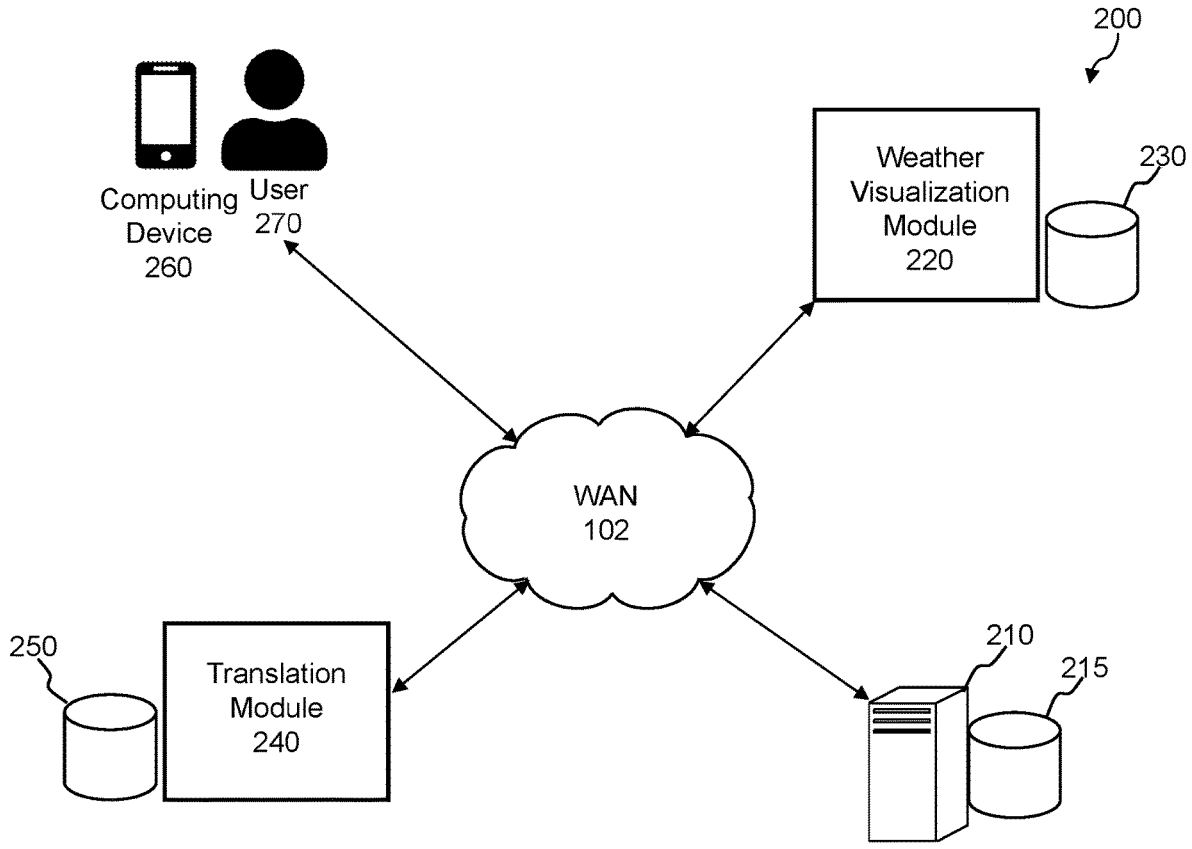
FIG. 2 illustrates a block diagram of a virtual physics-based weather visualization system environment, according to an exemplary embodiment.

Referring now to FIG. 2, a functional block diagram of a networked computer environment illustrating a computing environment for a virtual physics-based weather visualization system 200 (hereinafter "system") comprising a server 210 communicatively coupled to a database 215, a weather visualization module 220, a weather visualization module database 230, a translation module 240, a translation module database 250, and a computing device 260 associated with a user 270, each of which are communicatively coupled over WAN 102 (hereinafter "network") and data from the components of system 200 transmitted across the network is stored in database 215.

In some embodiments, server 210 is tasked with providing the platform configured to facilitate visualization of weather and weather impacts within digital environments in addition to performing transformation of streaming weather data into axis data utilized by one or more texture models operated by weather visualization module 220. The axis data is the direct result of transforming the weather data from various data formats including, but not limited to Keyhole Markup Language (KML), Comma Separated Values (CSV), Hierarchal Data Format 5 (HDF5), Gridded Binary or General Regularly-distributed information in Binary Form (GRIB), Network Common Data Form (NetCDF), Hierarchal Data Format-Earth Observing System (HDF-EOS), SIGMET messages, etc into UV layers that are overlayed onto digital environments such as virtual worlds operated by the applicable VR, AR, XR, and/or mixed reality platforms in a manner in which virtual objects reflect physics-based impacts derived from the weather data (e.g., virtual object being moved, virtual object being reflective, virtual object being slippery, etc.). In a working example, the GRIB data may comprise a plurality of dimensions such as, longitude, latitude, category (e.g., type of weather), and a physics-based value, in which a UV map functions as a texture comprising r, g, b, a values that are converted into axis data comprising a plurality of vectors representing x, y, z, and intensity (i.e., amount of physical force applied in a particular direction). For example, the axis data may be derived from GRIB data configured to comprise data relating to wind, current, and the like for regular points over a geographic area at a number of future time instances, in which compute shaders (e.g., vertex shader, fragment shader, etc.) supply the code for converting coordinates, determining the color of drawn pixels, etc. for the purpose of rendering "texture" as a parameter based on the analyzed weather data. The texture comprises UV/texture coordinates that serve as references to specific locations on the texture and texture mapping which is a list of two-dimensional UV coordinates mapped to their 3D vertex counterparts on the surface in a plurality of dimensions. In some embodiments, GRIB data format may represent a variety of different weather properties (wind, heat, etc.) when system 200 reads this data, in which an automatic determination as to which properties weather visualization module 220 is interested occurs resulting in transformation of the associated data onto the UV map. This gives visualization module 220 extreme flexibility on how to interpret that weather data and what it can use it for within the digital environment. Once a UV map is generated, weather visualization module 220 may layer these UV maps in a variety of manners subject to what the desired outcome is. Examples include, but are not limited to stacking UV maps to form a height map or stitching them side-by-side to form a larger map. In some embodiments, the platform functions as a mechanism for user 270 to access one or more graphical user interfaces via computing device 260 in order to contribute, edit, etc. weather data collected by system 200. In some embodiments, server 210 is further configured to ascertain raw weather variables from collected weather data via utilizing different aggregation operations and determine threshold values, which are derived values that are used to generate additional variables, based on historical data, subject matter expert (SME) knowledge, e.g., snow threshold, max wind guest, wind speed, etc. The weather variables are stored in database 215 for subsequent processing by weather visualization module 220.

Weather visualization module 220 is tasked with rendering the visualizations of the weather data translated by translation module 240 that are depicted within digital environments. In addition, weather visualization module 220 is tasked with operating the texture model which is designed to function in a scalable manner that reduces the amount of computing resources necessary to manifest the visualizations of weather data and physics-based impacts derived from the weather data. For example, traditionally Perlin noise shaders are applied to the two-dimensional UV coordinates to ascertain surfaces; however, this approach does not support real-time visualizations. Weather visualization module 220 is designed to utilize one or more physics engines in order to visualize weather data within digital environments and virtual objects thereof in a scalable manner via operating the texture model. In some embodiments, the one or more physics engines interact with one or more virtual objects within a digital environment; thus, simulating physics-based weather impacts acting on the virtual objects. Examples of physics-based weather impacts may include, but are not limited to leaves falling or decaying on a tree, wind hitting and moving various virtual objects, reflections/refraction displayed on virtual objects caused directly by weather, and the like. Weather visualization module 220 maintains the texture model based on dynamic and historical weather data transformed into UV maps/texture maps, in which the texture/UV maps, channels, textures, etc. are configured to be stored in weather visualization module database 230 allowing the texture model to continuously be updated as the streaming weather data is being processed by system 200. In some embodiments, weather visualization module 220 further comprises one or more physics engines configured to interact with the converted weather data in a manner that allows it to be permanently altered within the digital environment. This solves the issue of persistent changes within streaming weather data by the physics engine established constants that may be manifested in the digital environment and stored in weather visualization module database 230 for subsequent use, if applicable.

Translation module 240 is tasked with transforming the streaming and historical weather data into axis data to be applied to the texture model. Furthermore, translation module 240 is configured to utilize one or more machine learning models to output predictions pertaining to not only weather data, but also physics-based weather impacts derived from analyses of the weather data. The outputs of the one or more machine learning models are stored in translation module database 250. Translation module 240 also supports sampling and polling of weather data at intervals in order to ensure optimal performance. It should be noted that the sampling and polling of weather data at various intervals not only promotes scalability when processing weather data due to the voluminous amount of weather data being streamed, but also ensures that the physics-based weather impacts applied to the virtual objects are realistically depicted within the digital environment. For example as the weather progressively begins to get colder (i.e., fall to winter), a virtual object such as a tree depicted in a digital environment will begin to experience modifications, such as progressively going from lush with leaves to barren due to the change in the weather. The aforementioned is vividly depicted by weather visualization module 220 based on translation module 240 performing polling and sampling at various time intervals in a manner that significantly reduces the amount computing resources that would be needed to process weather data across network 102. In another example, traditionally multiple wind zones are utilized to adequately represent a given terrain. However, this approach does not scale well for larger outdoor environments, such as digital environments where you have drastic changes within the terrain due to the fact that providing too many wind zones will drastically decrease performance. Thus, translation module 240 provides the functionality of toggling the states of wind zones based on the location associated with user 270 within the digital environment and providing static wind zones that do not change over time; therefore, resulting in a reduction of computational costs by preventing the constant management of the states of various wind zones.

Computing device 260 may take the form of a desktop computer, laptop computer, tablet computer, smart phone, smart watch or other wearable computer, mainframe computer, computer-mediated reality (CMR) device/VR device, quantum computer or any other form of computer or mobile device now known or to be developed in the future that is capable of running a program, accessing a network, or querying a database. It should be noted that in the instance in which computing device 260 is a CMR device (e.g., VR headset, AR goggles, smart glasses, etc.) or other applicable wearable device, computing device 260 is configured to collect sensor data via one or more associated sensor systems including, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, internet-of-things ("IOT") sensors, or any other applicable type of sensors known to those of ordinary skill in the art.

Figure 3:
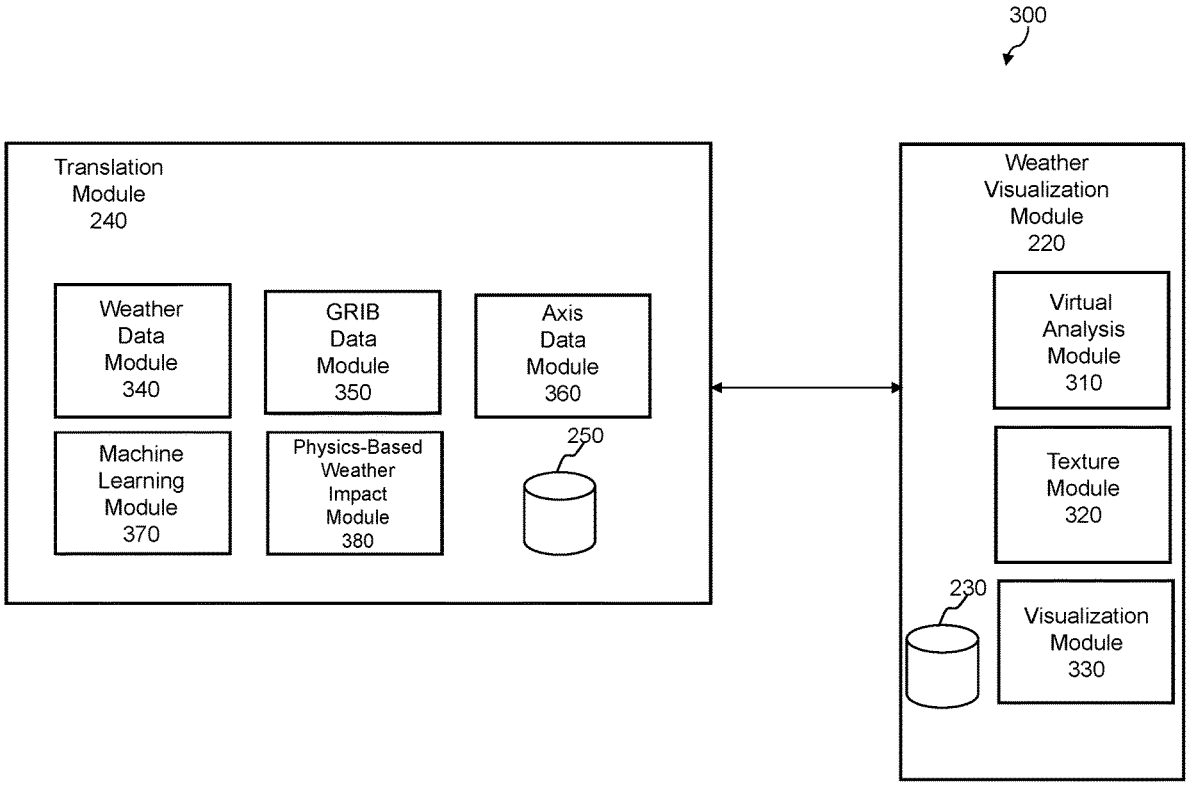
FIG. 3 illustrates a block diagram of various modules associated with the virtual physics-based weather visualization system of FIG. 2, according to an exemplary embodiment.

Referring now to FIG. 3, an example architecture 300 of weather visualization module 220 and translation module 240 is depicted, according to an exemplary embodiment. Weather visualization module 220 comprises a virtual analysis module 310, a texture module 320, and a visualization module 330. Translation module 240 comprises a weather data module 340, a GRIB data module 350, an axis data module 360, a machine learning module 370, and a physics-based weather impact module 380. It should be noted that weather visualization module 220 and translation module 240 are communicatively coupled over the network allowing for outputs and/or analyses performed by each respective module to be utilized in applicable training datasets to be utilized by applicable machine learning models operated by machine learning module 370 and/or applicable cognitive systems associated with system 200.

Virtual analysis module 310 is tasked with analyzing physical spaces and digital environments associated with physical spaces and digital environments associated with computing device 260 and/or user 270. It should be noted that various factors associated with computing device 260 and/or user 270 may be taken into consideration by virtual analysis module 310 during analyses, such as but not limited to physical surroundings (e.g., architectures, time periods/time of day, etc.), geographic location, current/historical weather data, linguistic inputs, speech patterns, gestures, and the like. Virtual analysis module 310 may utilize image/video analysis, natural language processing (NLP), parsing, tokenizing, 3D point cloud segmentation, virtual object detection, theme identification, or any other applicable VR/AR-based analysis mechanisms known to those of ordinary skill in the art. In some embodiments, virtual analysis module 310 ascertains a context associated with a physical space and/or digital environment based on analyses of weather data performed by weather data module 340. The weather data may indicate that it is currently raining outside in which the context established may determine the affect on virtual objects within the applicable digital environment. For example, based on the established context, weather visualization module 220 may perform visualization of one or more puddles adjacent to the virtual objects within the digital environment resulting in not only the virtual objects displaying traits of dampness from either the precipitation or nearby puddles, but also the reflection of the virtual objects appearing within the one or more puddles. In some embodiments, movements of bodies and gestures occurring proximate to computing device 260 may allow virtual environment analysis module 310 to ascertain the context of the physical and/or virtual environment associated with user 270. For example, computing device 260 may detect that user 270 is trembling indicating that it is cold outside and that user 270 is cold, in which the analyses performed on the weather data may confirm this indication. As a result the context is established that the weather is cold and virtual objects within the applicable digital environment may be affected based on the established context (e.g., icicles forming on the virtual objects, water vapor being emitted from virtual objects, etc.)

Texture module 320 is tasked with operating the one or more texture models derived from the UV mapping process.

In some embodiments, the texture model is a result of UV mapping in which a two-dimensional image is projected onto a three-dimensional model to provide two-dimensional texture and/or image color. The "U" and the "V" of "UV" may refer to the horizontal/vertical axes and/or axis data, respectively, of the two-dimensional space, as X, Y, and Z may already be used in a three-dimensional space along with a fourth value z, representing intensity. Therefore, the UV maps are configured to be overlayed on virtual objects within the digital environment in a manner in which the axis data applied via the texture model initiates the physics-based weather impacts. In some embodiments, user 270 may access the platform in order to manually toggle the physics-based weather impacts to be applied within the digital environment. This includes allowing user 270 to alter one or more states of wind zones in the digital environment, modify the visual effect a physics-based weather impact has on a virtual object (e.g., radiance, opaqueness, reflectiveness/refractiveness, etc.), and the like. For example, the weather data indicating very sunny weather may result in a virtual object comprising a highly level of reflectivity depending on the texture of the virtual object along with the direction the sun is shining on the virtual object, in which user 270 may reduce the brightness being emitted from the particular virtual object.

Visualization module 330 is tasked with rendering and visualizing the digital environment and virtual objects affected by the physics-based weather impacts on computing device 260 presented to user 270. In some embodiments, visualization module 330 is based on one or more of weather data analyses, contextual information, and the like. Visualization module 330 may utilize a generative adversarial networks (GANs) and/or any other applicable VR/AR content mechanisms configured to support dynamic virtual content generation/modification, in which the rendering of digital environments and virtual objects thereof may comprise creating 3D scenes, applying lighting and shading effects, generating textures based on physics-based weather impacts, etc. in order to make physics-based weather impacts look realistic. In some embodiments, visualization module 330 renders the visualizations of the physics-based weather impacts by overlaying the UV mappings on the digital environment and its virtual objects in accordance with the applicable texture models.

Weather data module 340 is tasked with collecting and maintaining historical and streaming weather data of a geographic region. In addition to the weather data indicating current and future climates, the weather data may also be utilized to detect and analyze weather-caused events such as, but not limited to hurricanes, typhoons, tornadoes, snowstorms, windstorms, thunderstorms, landslides, power outages, and any other applicable weather-caused event known to those of ordinary skill in the art. In some embodiments, weather data module 340 is further configured to calculate various evaluation metrics for the weather data such as, but not limited to root mean square error, false alarm rate, hit rate, mean absolute percentage error, and the like in order to optimize the analyses of the weather data. Weather data module 340 may also take into consideration characteristics pertaining to the geographic area associated with the collected weather data such as number of infrastructures (e.g., residences, businesses, etc.), number of power lines, power grids, geography, etc. in order to support virtual analysis module 310 in its analysis of the physical space associated with user 270 and ultimately the visualization of the digital environment and virtual objects depicted therein. Historical and streaming weather data for the particular geographic area associated with the collected weather data are stored in translation module database 250.

GRIB data module 350 is tasked with converting the weather data collected by weather data module 340 into GRIB data. As weather data is collected, analysis of at least one of a type of the virtual object, a physics material, and a physics constraint is performed, in which simultaneously color values (i.e., R, G, B, A) are ascertained from the GRIB data as parameters representing intensities at various intervals. The color values are designed to be converted into axis values associated with the digital environment at the time intervals. This approach for ascertaining the aforementioned values allows for the GRIB data to be read for the purpose of subsequent transformation onto 2D textures of the virtual objects. Thus, parameters comprising numerical information such as winds, pressures, temperatures, etc. describing weather data are provided in a grid comprising vertices that represent geographic regions, in which the grid comprises weather data collected by weather data module 340 for each vertex. In some embodiments, weather data module 340 communicates with machine learning module 370 in order to maintain a weather prediction model, in which the vertices are configured to indicate outputs of the weather prediction model. As previously mentioned, GRIB data may account for precipitation (e.g., rain, snow, hail, etc.), wind speed, wind direction, wind gusts, wave height, relative humidity, temperature, ozone concentration, ceiling, dewpoint, visibility, sky coverage, environmental condition parameters, and the like.

Axis data module 360 is tasked with transforming the GRIB data into axis data utilized by one or more texture models operated by weather visualization module 220. In particular, axis data module 360 is tasked with converting the color values (i.e., r, g, b, a) ascertained by GRIB data module 350 into axis data values (i.e., x, y, z, v) at each of the various intervals. For example, the conversion into axis data may allow data associated with wind strength, wind turbulence, wind pulse, wind direction, etc. to be accounted for. The ascertained axis data is ultimately utilized by the texture model to manifest physical and/or visual effects on the digital environment and the virtual objects therein. The axis data is stored in translation module database 250. In some embodiments, axis data module 360 may ensure that the axis data accounts for constraints and interpolation associated with the virtual objects, in which the constraints are correlated to the physics applied to the digital environment maintained by physics-based weather impact module 380 and the interpolation relates to the virtual object's position and rotation between physics updates; thus, improving smoothness of the visualization and reducing the amount of jittering. In particular, the constraints allow the data to account for preventing particular degrees of freedom for a virtual object's movement. For example, the virtual object is restricted from moving along certain axes or prevented from rotating around specific axes, in which this is reflected within axis data and manifested within the digital environment upon activation of the physic-based weather impacts.

Machine learning module 370 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 370 is designed to maintain one or more machine learning models dealing with training datasets including data derived from one or more of database 215, weather visualization module database 230, translation module database 250, and any other applicable internet-based data source (e.g., weather database, social media platform database, crowd sourcing database, subject matter expert database, etc.). Furthermore, the one or more machine learning models are designed to generate outputs representing predictions pertaining to physics-based weather impacts based on analyses of the weather data across the various time intervals. In some embodiments, the one or more machine learning models also take into consideration the inherent characteristics of the virtual objects analyzed by virtual analysis module 310. For example, the collected weather data may indicate that the climate associated with geographic location of user 270 is hot and sunny and the digital environment may comprise a virtual object such as a cold plastic water bottle, in which the one or more machine learning models may predict that the hot weather will impact the virtual object; thus, as a result the physics-based weather impact on the virtual object causes the virtual object to not only sweat but also lose firmness.

Physics-based weather impact module 380 is tasked with managing physics-based weather impacts applied to the digital environment and its virtual objects therein. It should be noted that the UV layers derived from the axis data are overlayed onto digital environments in a manner in which virtual objects reflect the physics-based impacts. The physics-based weather impacts are physics simulations that reflect various impacts to physical characteristics of virtual objects including, but not limited to mass, drag, angular drag, gravity, forces, collisions, and the like. In some embodiments, physics-based weather impacts account for constraints comprised within the axis data in order to optimize the visualizations of the physics-based weather impacts in a realistic manner. Physics-based weather impacts may be visualized in a variety of manners including, but not limited to leaves falling or decaying on a tree, wind hitting and moving various virtual objects within the digital environment in real-time, liquid derived from precipitation altering the physical characteristics of virtual objects, heat causing condensation on applicable virtual objects, or any other applicable weather related impacts configured to be visualized known to those of ordinary skill in the art. In some embodiments, physics-based weather impact module 380 renders the physics-based weather impacts in a manner that accounts for one or more of applicable weather strength, turbulence, pulse, direction, and the like; thus, allowing physics-based weather impacts to be toggled in the digital environment based on one or more of the aforementioned factors in addition to contextual information, weather data analyses, etc.

Figure 4:
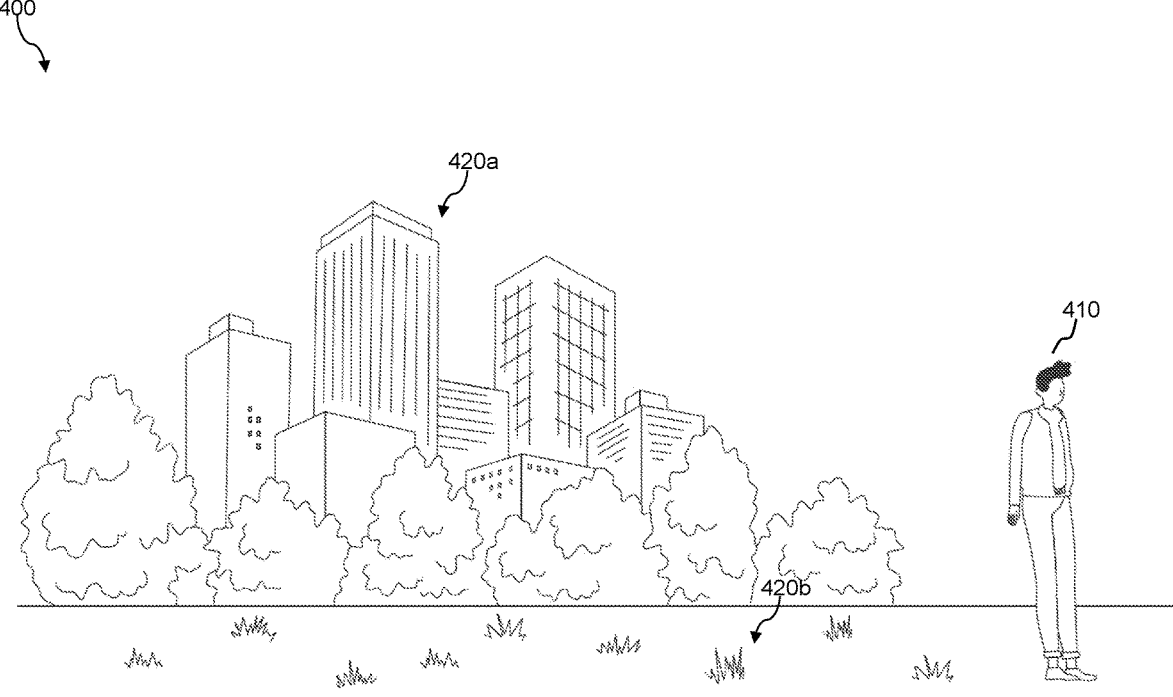
FIG. 4 illustrates a digital environment including an avatar and a plurality of virtual objects, according to an exemplary embodiment.

Referring now to FIG. 4, a digital environment 400 is depicted, in accordance with an exemplary embodiment. As depicted, digital environment 400 comprises an avatar 410 configured to serve as a digital representation of user 270, and a plurality of digital objects 420a-b. In some embodiments, virtual analysis module 310 is performing analyses on digital environment 400, avatar 410, digital objects 420a-b (e.g., inherent physical properties), user 270 (i.e., interactions with the digital environment and analyses of applicable sensor data derived from computing device 260), etc. in order to ascertain contextual information associated with digital environment 400 and/or the applicable physical space that digital environment 400 is derived from. For example, digital environment 400 may reflect a progressive change of the weather over a given time period (e.g., from warm and sunny to cool and windy) based on analyses of the streaming weather data, in which it may be ascertained and visualized that digital objects 420a-b are being directly impacted by the weather.

Figure 5:
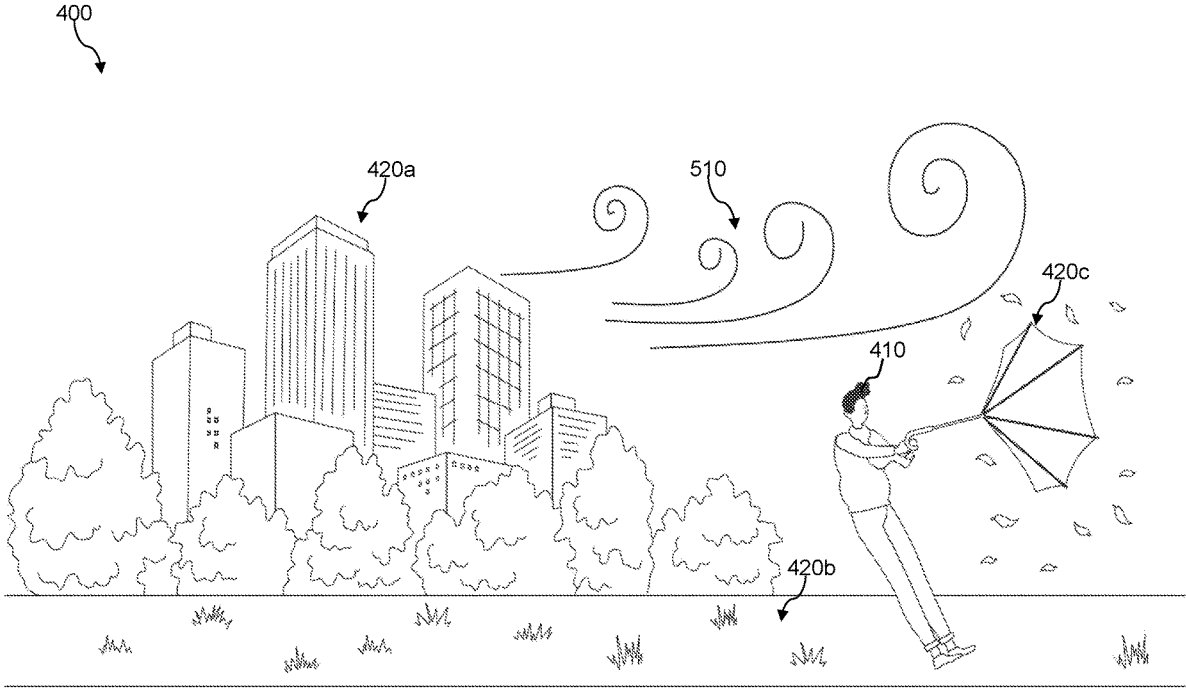
FIG. 5 illustrates the digital environment of FIG. 4 with physics-based weather impacts applied to the avatar and plurality of virtual objects, according to an exemplary embodiment.

Referring now to FIG. 5, digital environment 400 of FIG. 4 is depicted impacted by physics-based weather impacts 510, in accordance with an exemplary embodiment. In some embodiments, physics-based weather impact module 380 overlays UV maps derived from the transformation of the GRIB data on digital environment 400. As a result, the axis data that corresponds to at least the GRIB data is applied via the texture model; thus, physics-based weather impact module 380 may initiate physics-based weather impacts 510 that are visualized within digital environment 400 as shown in FIG. 5. As depicted, physics-based weather impacts 510 visualize the strength, turbulence, pulse, direction, etc. associated with the analyzed weather data, which is accounted for in the axis data. The physics-based weather impacts 510 are applied to avatar 410 and digital objects 420a-c, which are visualized in digital environment 400 by visualization module 330. In some embodiments, physics-based weather impacts 510 may be optimized by machine learning module 370 operating a feedback loop and/or human in the loop approach to ensure that the predictions of the one or more machine learning models pertaining to the analyzed weather data and/or physics-based weather impacts 510 are not only represented correctly from a physics-based perspective, but also applied and visualized in digital environment 400 in the most optimal manner.

Figure 6:
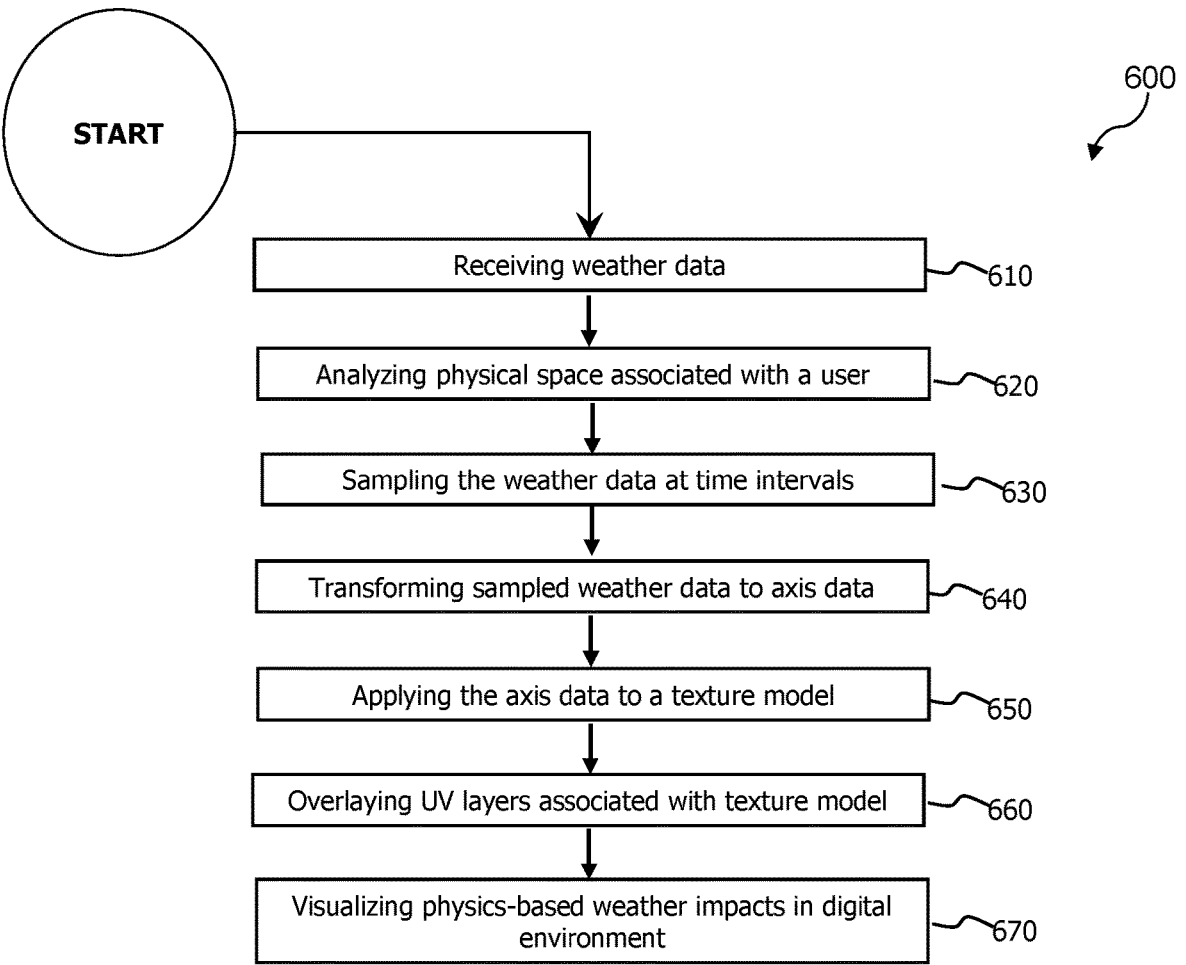
FIG. 6 illustrates an exemplary flowchart depicting a method for visualizing weather in a digital environment, according to an exemplary embodiment.

With the foregoing overview of the example architecture, it may be helpful now to consider a high-level discussion of an example process. FIG. 6 depicts a flowchart illustrating a computer-implemented process 600 for visualizing weather in a digital environment, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, weather data module 340 receives weather data. As previously mentioned, weather data refers to any applicable historical and/or streaming climate information including, but not limited to data ascertained from weather Geographic Information Systems (GIS), Meteorological Simulation Data Ingest System (MADIS), Environmental Systems Research Institute (ESRI), PRISM/RMA, social media platforms, crowd-sourcing platforms, machine learning-based systems generating predictions based on data derived from the aforementioned, and any other applicable weather and/or geographical information data sources known to those of ordinary skill in the art. In some embodiments, server 210 is configured to ascertain raw weather variables from collected weather data via utilizing different aggregation operations and determine threshold values, which are derived values that are used to generate additional variables, based on historical data, subject matter expert (SME) knowledge, e.g., snow threshold, max wind guest, wind speed, etc. The weather variables are stored in database 215 for subsequent processing by weather visualization module 220 and/or translation module 240. Weather data module 340 may also ascertain environmental parameters associated with weather data such as, but not limited to weather-related phenomena, species occurrences, human population, soil types, land cover, elevation, mean annual temperature, mean diurnal temperature range, isothermality, temperature seasonally, maximum temperature of warmest month, minimum temperature of coldest month, temperature annual range, annual mean precipitation, precipitation of the wettest month, precipitation of the driest month, precipitation seasonally, diurnal temperature range, frost-free days, solar radiation, annual mean monthly minimum temperature, annual mean monthly maximum temperature, vapor pressure, wet days, actual and potential evapotranspiration, moisture deficit and surplus, soil moisture, normalized difference vegetation index, life zones, soil class, vegetation class, vegetation type, wetlands, world ecosystems, actual forest cover, elevation, potential vegetation, proximity to coast, species occurrence data, soil types, elevation, watersheds, lakes and land use, and the like.

At step 620 of process 600, virtual analysis module 310 analyses the physical space associated with user 270. In addition to conventional sensor data analyses associated with sensor data derived from computing device 260 (e.g., mapping of physical space, VR/AR techniques, etc.), virtual analysis module 310 is designed to utilize artificial intelligence techniques such as but not limited to, natural language processing (NLP), linguistics analysis, image analysis, topic identification, virtual object recognition, setting/environment classification, and any other applicable artificial intelligence and/or cognitive-based techniques in order to analyze physical spaces and digital environments. One of the purposes of virtual analysis module 310 analyzes physical spaces and virtual environments for system 200 is to ascertain contextual information associated with rendering a digital environment in light of the continuously streaming weather data; thus, the digital environment may be updated in real-time to reflect the changes in the climate occurring in the geographic region associated with the physical space being analyzed.

At step 630 of process 600, translation module 240 performs sampling of the collected weather data at various time intervals. In particular, translation module 240 performs sampling and polling of weather data at intervals in order to ensure optimal performance and scalability. It should be noted that the sampling and polling of weather data at various intervals not only promotes scalability when processing weather data due to the voluminous amount of weather data being streamed. In some embodiments, the intervals for sampling and polling are determined based on one or more of weather anomalies, thresholds (snow threshold, max wind guest, etc.), computing resource overhead allocation, etc.

At step 640 of process 600, translation module 240 transforms sampled weather data into axis data. In particular, color values (i.e., R, G, B, A) are ascertained from the GRIB data (or other applicable weather data format) as parameters representing intensities at various intervals. The color values are converted into axis values associated with the digital environment at the time intervals. In some embodiments, the axis values are aligned with one or more weather-based impacts due to the fact that they correlate to a plurality of vectors representing x, y, z, and intensity (i.e., amount of physical force applied in a particular direction). As previously mentioned, the converted weather data is configured to interact with the physics engines of weather visualization module 220 in which the physics engines render permanently alterations to the weather data to allow constants to be visualized within digital environments and virtual objects thereof in a scalable manner via operating the texture model.

At step 650 of process 600, axis data module 360 applies the axis data to a texture model operated by texture module 320. As previously mentioned, the texture model is a result of UV mapping in which a two-dimensional image is projected onto a three-dimensional model to provide two-dimensional texture and/or image color. The "U" and the "V" of "UV" may refer to the horizontal/vertical axes and/or axis data, respectively, of the two-dimensional space, as X, Y, and Z may already be used in a three-dimensional space along with a fourth value z, representing intensity. In some embodiments, texture models may be specific to digital objects within the digital environment allowing wind zones, temperatures, intensities derived from weather-based occurrences, etc. to edit, manipulate, and/or contour digital objects in real-time based on updates ascertained by the continuously processed weather data.

At step 660 of process 600, visualization module 330 overlays the UV layers associated with the texture model. It should be noted that the UV layers are derived from the axis data and mappings of the UV layers are overlayed onto digital environments in a manner in which physics-based weather impacts may be toggled in the digital environment to visualize continuously evolving weather in virtual, augmented, mixed, and extended reality-based visualizations. In some embodiments, constraints such as virtual object inherent physical properties, virtual object inherent chemical properties, physics-based constraints (e.g., range of movement, dimension/space allocation), computation resource allocation limitations, and the like may be accounted for during the overlaying process in order to assure optimal visualization of physics-based weather impacts within the digital environment.

At step 670 of process 600, visualization module 330 visualizes physics-based weather impacts in the digital environment. As previously mentioned, the physics-based weather impacts are physics simulations that visually reflect various impacts to physical characteristics of virtual objects including, but not limited to mass, drag, angular drag, gravity, forces, collisions, and the like derived from analyses of weather data. Various examples of physics-based weather impacts include, but are not limited to wind gusts applied in directions on virtual objects, precipitation impacting the surface of virtual objects, evolving of ecosystems, drastic changes in the surrounding environment (e.g., environmental factors), and the like. In some embodiments, visualization module 330 may utilize a generative adversarial networks (GANs) and/or any other applicable VR/AR content mechanisms configured to support dynamic virtual content generation/modification, in which the rendering of digital environments and virtual objects thereof may comprise creating 3D scenes, applying lighting and shading effects, generating textures based on physics-based weather impacts, etc. in order to make physics-based weather impacts look realistic.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for visualizing weather in a digital environment, the method comprising:

receiving, by a computing device, a plurality of weather data;

converting, by the computing device, the plurality of weather data for a texture model associated with a plurality of virtual objects associated with the digital environment; and visualizing, by the computing device, at least one derivative of the conversion in the digital environment based on the model, wherein the at least one derivative of the conversion comprises a physics-based impact associated with the plurality of weather data applied to one or more of the plurality virtual objects, wherein physics-based elements of weather data are ascertained to visualize both weather and physics-based impacts within digital environments by utilizing texture model-based transformation of weather data streaming in real-time into physics-based weather impacts visualizations within digital environments in a scalable manner, and wherein axis data generated by conversion of the plurality of weather data is analyzed to determine whether the axis data accounts for constraints and interpolation associated with the virtual objects, in which the constraints are correlated to physics applied to the digital environment maintained by the physics-based weather impact module and to ensure that the interpolation relates to the virtual object's position and rotation between physics updates to improve smoothness of the visualization and reduce jitter.

2. The computer-implemented method of claim 1, wherein the converting the plurality of weather data comprises:

sampling, by the computing device, the plurality of weather data at a plurality of time intervals;

wherein the output of the sampling is a Gridded Binary or General Regularly-distributed information in Binary Form (GRIB) data.

3. The computer-implemented method of claim 2, wherein the converting of the plurality of weather data further comprises transforming, by the computing device, the GRIB data onto a two-dimensional texture of the plurality of virtual objects derived from the texture model.

4. The computer-implemented method of claim 3, wherein the transforming of the GRIB data as part of the conversion of the plurality of weather data further comprises converting a plurality of color values from the GRIB data into the plurality of axis values associated with the digital environment at the plurality of time intervals;

wherein the plurality of axis values align with one or more weather-based impacts to the plurality of virtual objects, and wherein the conversion into the plurality of axis values enables data associated with wind strength, wind turbulence, wind pulse, and wind direction to be represented as physical and/or visual effects on the digital environment.

5. The computer-implemented method of claim 1, wherein the digital environment is one or more virtual environments associated with virtual reality, augmented reality, extended reality, mixed reality, and gaming environment.

6. The computer-implemented method of claim 1, wherein converting the plurality of weather data comprises analyzing, by the computing device, at least one of a type of virtual object, a physics material, and a physics constraint associated with the plurality of virtual objects.

7. A computer program product for visualizing weather in a digital environment, the computer program product comprising one or more computer readable storage media and program instructions collectively stored on the one or more computer readable storage media, the stored program instructions comprising:

program instructions to receive a plurality of weather data;

program instructions to convert the plurality of weather data for a texture model associated with a plurality of virtual objects associated with the digital environment; and program instructions to visualize at least one derivative of the conversion in the digital environment based on the model, wherein the at least one derivative of the conversion comprises a physics-based impact associated with the plurality of weather data applied to one or more of the plurality virtual objects, wherein physics-based elements of weather data are ascertained to visualize both weather and physics-based impacts within digital environments by utilizing texture model-based transformation of weather data streaming in real-time into physics-based weather impacts visualizations within digital environments in a scalable manner, and wherein axis data generated by conversion of the plurality of weather data is analyzed to determine whether the axis data accounts for constraints and interpolation associated with the virtual objects, in which the constraints are correlated to physics applied to the digital environment maintained by the physics-based weather impact module and to ensure that the interpolation relates to the virtual object's position and rotation between physics updates to improve smoothness of the visualization and reduce jitter.

8. The computer program product of claim 7, wherein the program instructions to convert the plurality of weather data comprises program instructions to sample the plurality of weather data at a plurality of time intervals, and wherein the output of the sampling is a Gridded Binary or General Regularly-distributed information in Binary Form (GRIB) data.

9. The computer program product of claim 8, wherein program instructions to convert the plurality of weather data further comprise program instructions to transform the GRIB data onto a two-dimensional texture of the plurality of virtual objects derived from the texture model.

10. The computer program product of claim 9, wherein the program instructions to transform the GRIB data as part of the conversion of the plurality of weather data further comprise program instructions to convert a plurality of color values from the GRIB data into the plurality of axis values associated with the digital environment at the plurality of time intervals, wherein the plurality of axis values align with one or more weather-based impacts to the plurality of virtual objects, and wherein the conversion into the plurality of axis values enables data associated with wind strength, wind turbulence, wind pulse, and wind direction to be represented as physical and/or visual effects on the digital environment.

11. The computer program product of claim 7, wherein the digital environment is one or more virtual environments associated with virtual reality, augmented reality, extended reality, mixed reality, and gaming environment.

12. The computer program product of claim 7, wherein program instructions to convert the plurality of weather data comprises programing instructions to analyze at least one of a type of virtual object, a physics material, and a physics constraint associated with the plurality of virtual objects.

13. A computer system for visualizing weather in a digital environment, the computer system comprising:

one or more processors;

one or more computer-readable memories;

program instructions stored on at least one of the one or more computer-readable memories for execution by at least one of the one or more processors, the program instructions comprising:

program instructions to receive a plurality of weather data;

program instructions to convert the plurality of weather data for a texture model associated with a plurality of virtual objects associated with the digital environment; and program instructions to visualize at least one derivative of the conversion in the digital environment based on the model, wherein the at least one derivative of the conversion comprises a physics-based impact associated with the plurality of weather data applied to one or more of the plurality virtual objects, wherein physics-based elements of weather data are ascertained to visualize both weather and physics-based impacts within digital environments by utilizing texture model-based transformation of weather data streaming in real-time into physics-based weather impacts visualizations within digital environments in a scalable manner, and wherein axis data generated by conversion of the plurality of weather data is analyzed to determine whether the axis data accounts for constraints and interpolation associated with the virtual objects, in which the constraints are correlated to physics applied to the digital environment maintained by the physics-based weather impact module and to ensure that the interpolation relates to the virtual object's position and rotation between physics updates to improve smoothness of the visualization and reduce jitter.

14. The computer system claim 13, wherein the program instructions to convert the plurality of weather data comprise program instructions to sample the plurality of weather data at a plurality of time intervals, wherein the output of the sampling is a Gridded Binary or General Regularly-distributed information in Binary Form (GRIB) data.

15. The computer system claim 14, wherein the program instructions to convert the plurality of weather data further comprise program instructions to transform the GRIB data onto a two-dimensional texture of the plurality of virtual objects derived from the texture model.

16. The computer system claim 15, wherein the program instructions to transform the GRIB data as part of the conversion to convert the plurality of weather data further comprise program instructions to convert a plurality of color values from the GRIB data into the plurality of axis values associated with the digital environment at the plurality of time intervals, wherein the plurality of axis values align with one or more weather-based impacts to the plurality of virtual objects, and wherein the conversion into the plurality of axis values enables data associated with wind strength, wind turbulence, wind pulse, and wind direction to be represented as physical and/or visual effects on the digital environment.

17. The computer system claim 13, wherein the digital environment is one or more virtual environments associated with virtual reality, augmented reality, extended reality, mixed reality, and gaming environment.

* * * * *